Dec. 22, 1931. B. J. MUMM 1,837,280
SAUSAGE CASING AND PROCESS OF PRODUCING THE SAME
Filed Oct. 5, 1928 6 Sheets-Sheet 1

Inventor
Bernard Joseph Mumm
By his Attorneys

Dec. 22, 1931.   B. J. MUMM   1,837,280
SAUSAGE CASING AND PROCESS OF PRODUCING THE SAME
Filed Oct. 5, 1928   6 Sheets-Sheet 4

Inventor
Bernard Joseph Mumm
By his Attorneys

Dec. 22, 1931.   B. J. MUMM   1,837,280
SAUSAGE CASING AND PROCESS OF PRODUCING THE SAME
Filed Oct. 5, 1928   6 Sheets-Sheet 5

Patented Dec. 22, 1931

1,837,280

UNITED STATES PATENT OFFICE

BERNARD JOSEPH MUMM, OF ST. PAUL, MINNESOTA

SAUSAGE CASING AND PROCESS OF PRODUCING THE SAME

Application filed October 5, 1928. Serial No. 310,550.

My present invention relates to the production of animal casings usually designated as sausage casings, and comprises as a new product or article of manufacture an improved casing and process of producing the same.

In the making of various so-called summer sausages, dry sausages, luncheon meats, liver sausages and the like, it is customary and desirable to use the larger kinds of natural animal casings such as beef bungs, large beef middles, and the large hog bungs, as containers for the meat or filler. The supply of large casings is inadequate to meet the demand of the trade and the limited supply has resulted in relatively high prices for the larger casings. There is a much larger and increasing supply of smaller casings due to the fact that smaller cattle and hogs are being slaughtered in increasing numbers.

For the reasons above stated, it has been proposed in certain prior patents to make the larger casings by putting together two smaller casings in such a manner as to produce a large casing of substantially the diameter of the two smaller casings. Most of the smaller intestines used in the making of the larger casings are tapered and this is especially true of hog bungs. The demand of the trade is for substantially uniform casings, that is, casings that either have a constant diameter or do not vary greatly from constant diameter from one end to the other. In the schemes heretofore proposed for making the larger casings out of two tapered smaller intestines such as hog bungs, for example, the tapered smaller intestines have been put together in such a way that the taper of both were in the same direction, and this primarily had the effect of practically doubling the taper of the larger casing thus formed.

In accordance with the schemes heretofore proposed to increase the taper produced by putting together the two tapered casings, as the small end to small end and large end to large end, it has been proposed to offset, decrease or obviate to some extent the natural taper thus produced by stretching the smaller ends of the casings to substantially the diameter of the larger ends. This proposed scheme, however, does not, in practice, work out as intended for the reason that it is practically impossible to stretch the smaller ends to the diameter of the larger ends and even if that result might, in some instances, be accomplished, the casing produced would be relatively thin and much weakened at one end, and relatively thick and under substantially no tension at its larger end, so that when the casing was stuffed, there would be a tendency to bulge or stretch the larger end.

In accordance with my invention, I produce enlarged animal casings that are uniform or of substantially constant diameter from end to end by assembling the tapered intestines in reversed tapered arrangement, that is, with the small end of the one intestine at the large end of the other intestine and in such a way that the taper of the one intestine offsets the taper of the other. Usually, the casings will be made each from two smaller intestines, but in other instances and whenever found desirable, the casings may be made up of more than two, for example, of four smaller tapered intestines, in which latter suggested arrangement two of the intestines would be assembled with their small ends in one direction and the other two would be assembled with their small ends in the opposite direction.

My invention above outlined may be carried out in a great many different ways, but usually the intestines will be longitudinally split and their edges stitched together. Stitching is the best means for connecting the edges of the slit intestines in the formation of the casing, but stitches do have the disadvantage that they somewhat weaken the edges of the casing and will tend to leak the juices of the meat stuffed in the casing.

These objectionable features, however, are entirely eliminated by applying combined reenforcing and sealing strips of the animal intestines, such as strips of Chinese hog intestines or the like, over the stitched seams.

Several of the many ways of carrying out the invention above generally outlined are illustrated in the accompanying drawings, wherein like characters indicate like parts throughout the several views.

Referring to the drawings.

Figure 1:
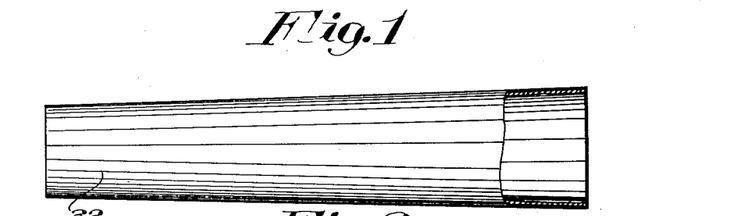
Figs. 1 and 2 are plan views with some parts broken away and some parts sectioned, showing two similar sections of animal intestines such as hog bungs from which a larger casing is to be made.
Figure 2:
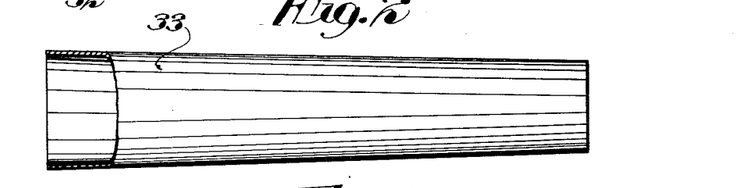
Figure 3:
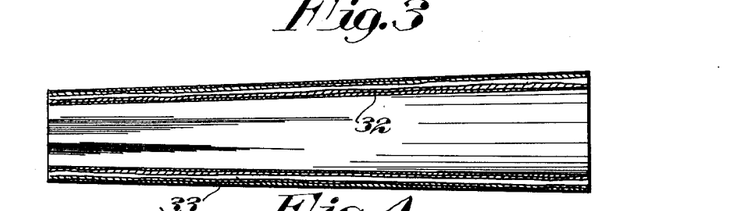
Fig. 3 is an axial section showing the two intestines, Figs. 1 and 2, telescoped in reverse tapered arrangement.

The process of carrying out the invention will appear in the description of the structures illustrated in the drawings, and the manner in which they are produced. Attention is first called to the structure illustrated in Figs. 1 to 14, inclusive. Directing attention first to Figs. 1 and 2, the numerals 32 and 33 indicate two tapered animal intestines such as hog bungs, which, of course, may be of varying length, but in practice will be about 27 to 30 inches long. Normally, or as they come from the animal, these intestines will have their fatty surface on the exterior and the smooth slimy surface on the interior, but the intestines intended for casings usually come to the trade turned inside out. The said two sections illustrated in Figs. 1 and 2 are to be telescoped the one over the other in reverse tapered arrangement, but inasmuch as the smooth normal inner surfaces of the intestines should be brought into contact, it is evident that one or the other of said sections must be turned so that its fatty surface will be inside. Hence, we will assume that the intestine 32 has its smooth surface on the outside and that the intestine 33 has its smooth surface on the inside, in which case the contact of smooth surfaces will be accomplished by telescoping the intestine 33 over the intestine 32, as shown in Fig. 3. Of course, when the two intestines are telescoped, as shown in Fig. 3, the large end of the inner intestine 32 will be contracted within the small end of the outer tube 33 and will be crinkled and not at full diameter.

Figure 4:
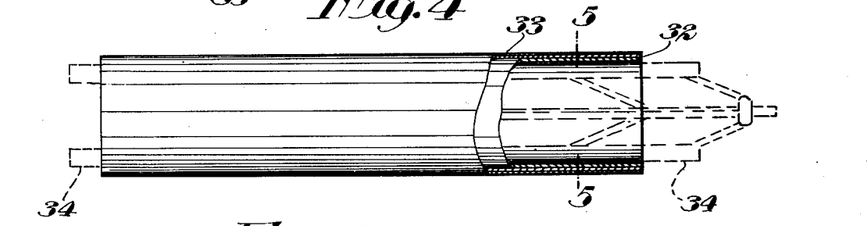
Fig. 4 is a view partly in plan and partly in section showing the two telescoped intestines of Fig. 1 slightly expanded by an expansible stretcher, the latter being indicated by dotted lines.
Figure 5:
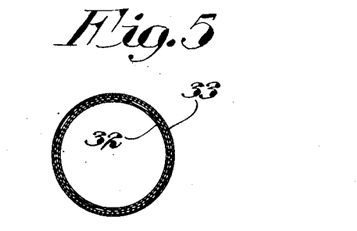
Fig. 5 is a section on the line 5—5 of Fig. 4, but showing the two intestines as if blown up into cylindrical form.
Figures 6, 7:
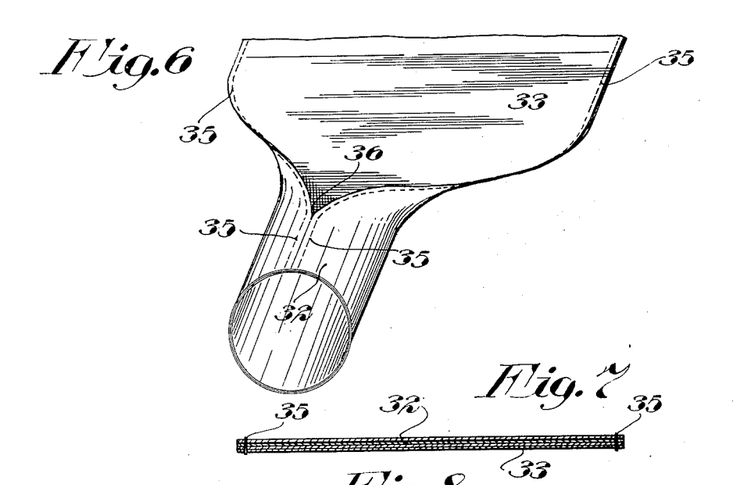
Fig. 6 is a perspective showing the two telescoped intestines after they have been stitched together and in the process of opening up.
Fig. 7 is a transverse section showing the two intestines laid out flat after they have been stitched together.

As a next step in the preparation of the casing, an expansible former such, for example, as shown in Fig. 4 and indicated as an entirety by the numeral 34, is inserted through the inner intestine and the two intestines are slightly expanded so as to bring their walls into somewhat close contact, but without, to any considerable extent, actually stretching the smaller ends of the intestines. While on the former, the two slightly expanded intestines are permitted to slightly set so that they will cohere against slippage to any considerable extent, this setting being desirable to prepare the telescoped intestines for the next step, which consists either in first running two lines of stitches longitudinally thereof and then slitting between the stitches, or first slitting the two tubes longitudinally and then stitching together the slit edges. Advisably, two rows of stitches 35 are run parallel and close together longitudinally of the two intestines and then the tubes are slit between the stitches, as indicated at 36, as best illustrated in Fig. 6. Stitches can be formed in the telescoped intestines, before they are slit, by the use of a stitching apparatus much like that found with the Singer sewing machine for the stitching of garment sleeves and which means are arranged to simultaneously stitch two parallel closely adjacent rows of stitches. For the purpose of slightly expanding the telescoped intestines, it will, of course, be understood that any suitable kind of former may be used.

Figure 8:
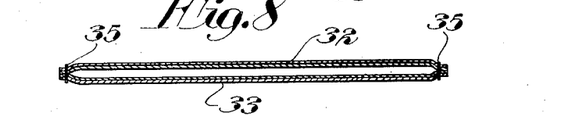
Fig. 8 is a view corresponding to Fig. 7 but showing initial separation of the body portions of the two intestines.
Figure 9:
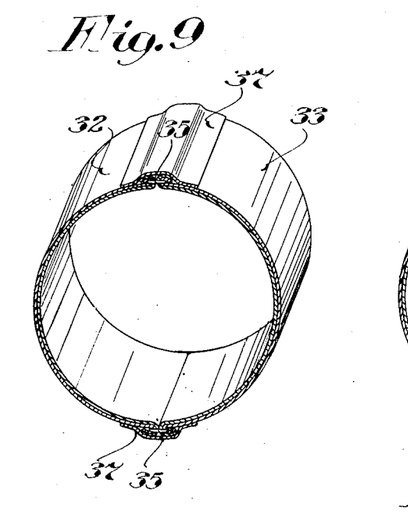
Fig. 9 shows the two intestines as they would appear when inflated, but with their seams on the outer side, the seams being reenforced.
Figure 10:
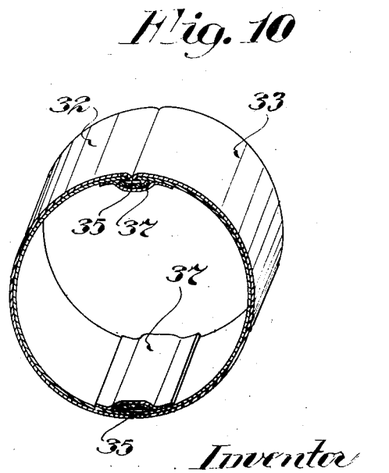
Fig. 10 is a view corresponding to Fig. 9 but showing the casing turned inside out in respect to Fig. 9.

Fig. 7 shows the two intestines 32 and 33 laid out flat and Fig. 8 shows the intestines between stitches slightly separated by the introduction of water or air under pressure between the same. When the casing formed by the two intestines is expanded, as shown in Fig. 9, the stitches will be at the outer side and at this stage the combined reenforcing and sealing strips 37 are applied over the seams and caused to adhere to the casing by any suitable means such as glue or in some instances by treating the strips with tannin, which has the effect of curing the strips to the casing. The casing produced as far as shown in Fig. 9 should then be soaked in luke warm water at a temperature of about 80 degrees for a short time or long enough to give back to the intestines their original flexibility and elasticity and then the casing is turned inside out in respect to Fig. 9, or as shown in Fig. 10, which brings the reenforced stitches and the reenforcing strips to the inner side of the casing. Obviously, the strips 37 applied at the inner side of the casing will not only reenforce the stitched edges but will seal the same so that juices and soft sausage dough cannot escape through the stitches. The reenforcement also is of the utmost importance because stitches, as already stated, weaken the stitched edges and the casings will be subjected not only to high pressure in the stuffing or filling action, but will be subjected to even greater stress in the cooking of the sausage or filler and particularly in the cooking of braunschweiger style liver sausage. The strips 37 also prevent water from seeping into the sausage during the cooking action.

Figure 11:
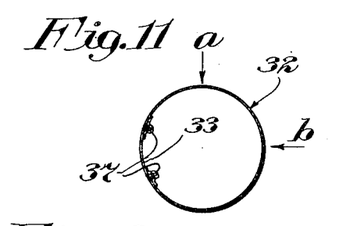
Figs. 11 and 12 are views showing the opposite ends of the completed casing.
Figure 12:
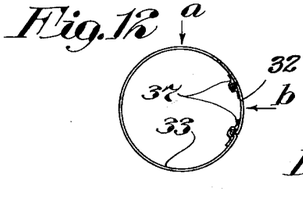
Figure 13:
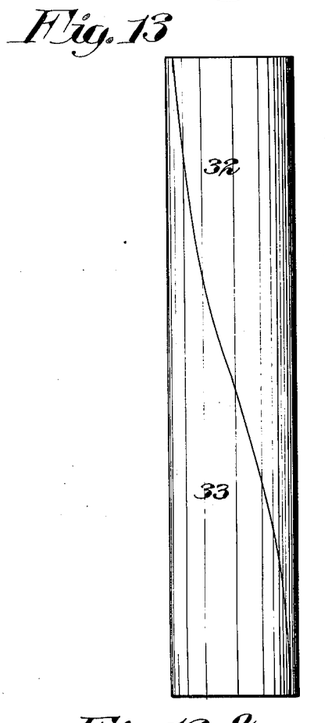
Fig. 13 is a plan view looking at the casing in the direction of the arrows marked a—a on Figs. 11 and 12.
Figure 14:
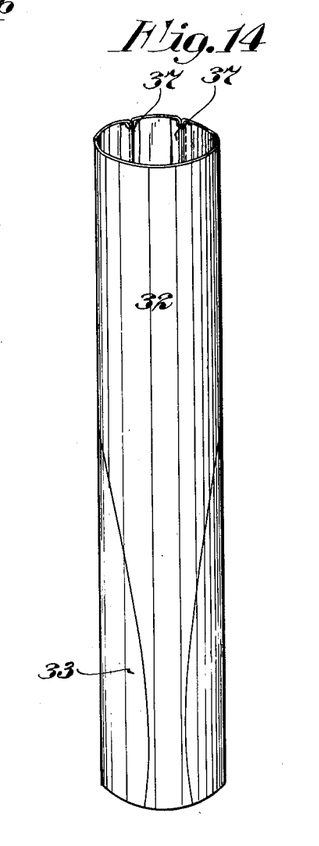
Fig. 14 is a side elevation of the casing shown in Fig. 13, looking at the same in the direction of the arrows marked b—b on Figs. 11 and 12.

It should now be evident that under the above manner of producing sausage casings from tapered intestines not only is the casing produced that is of the combined diameter of the intestines used, but that in view of the reversed tapered arrangement of the intestines, the produced casing will be of uniform or substantially uniform diameter or, at any rate, the taper of one intestine will offset the taper of the other intestine and that the produced casing will have substantially uniform stretch or tension throughout, that is, no one part or end of the casing will be put under any greater stretch or stress than the other. Attention is called to the fact that in the completed casing, the seams will be diametrically opposite only at the central portion of the casing while at the ends they will be as indicated in Figs. 11 and 12.

Figure 15:
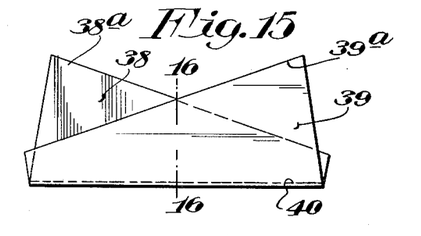
Fig. 15 is a plan view showing two slit tapered animal intestines laid out flat and assembled in reverse tapered arrangement for stitching.
Figure 16:
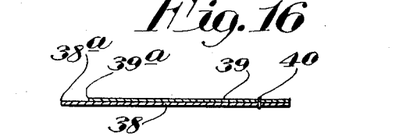
Fig. 16 is an enlarged section on the line 16—16 of Fig. 15, some parts being broken away.

The casing illustrated in the above described Figs. 1 to 14, inclusive, was made by telescoping two intestines before the intestines had been slit. In Figs. 15 and 16, however, the two reversely tapered intestines 38 and 39 have been slit and laid out flat and then two of their edges have been brought together and stretched as indicated at 40, and as the next step the edges 38ᵃ and 39ᵃ should be brought together in alignment and stitched together. When this is done, the stitches 40 will be at the outside of the casing. Also it should be assumed that the smooth surfaces of the intestines are in contact in Fig. 15 and the casing thus formed should then be turned inside out so as to turn the seams within the casing. Of course, the seams 40 can be reenforced when desired as in the other views described.

Figure 17:
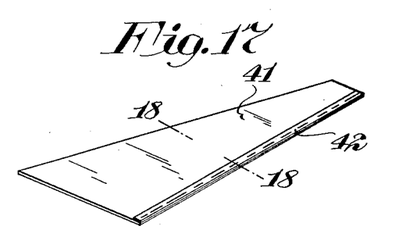
Fig. 17 shows one of the flat tapered intestines of Fig. 15 with a reenforced edge.
Figure 18:
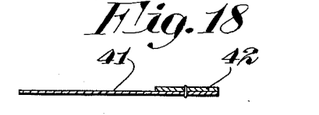
Fig. 18 is an enlarged fragmentary section taken on the line 18—18 of Fig. 17.

In Fig. 17 a slit casing 41 such as shown in Fig. 15 has its edge reenforced by the strip 42 of intestine adhesively applied thereto so as to reenforce the same on the stitching line. For dry sausages such as summer sausages, the sealing strips 37 would not be required but for weak intestines, the reenforcing strips 42 will be found desirable.

Figure 19:
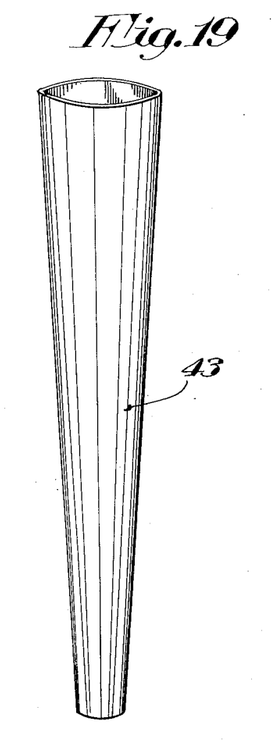
Fig. 19 shows a relatively long or double length intestine from which a casing is to be formed.
Figure 20:
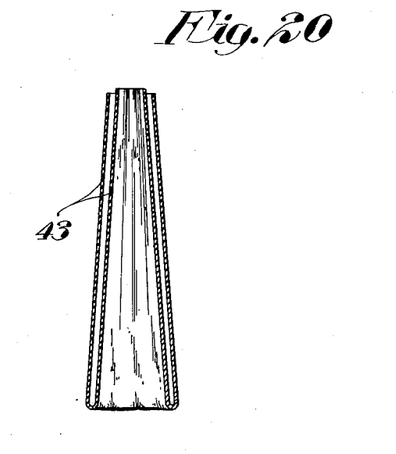
Fig. 20 is an axial section showing the intestine of Fig. 19 with the small half portion turned back over the large half portion.

Figs. 19 and 20 illustrate the manner of forming an enlarged uniform casing from telescoped tapered tube portions in reverse tapered arrangement from an intestine of twice the length of the produced casing. This double length intestine 43 is assumed to have been turned inside out so that the smooth portion is at the exterior and the fatty portion at the interior. The two portions of the tube are telescoped by turning the smooth half backward and over the larger half, thereby bringing the two smooth surfaces face to face, as shown in Fig. 20. This manner of turning the tube back upon itself is, of course, the substantial equivalent of placing one tapered intestine inside of the other in reverse tapered arrangement. After this has been done, the further operations necessary to complete the casing may be substantially the same as that described in connection with Figs. 1 to 14, inclusive. The casing as formed as illustrated in Figs. 19 and 20 would, of course, have the inner and outer portions integral at one end and sometimes this is desirable, but when it is not, the closed end may be readily cut off.

Figures 21, 22, 23, 24, 25:
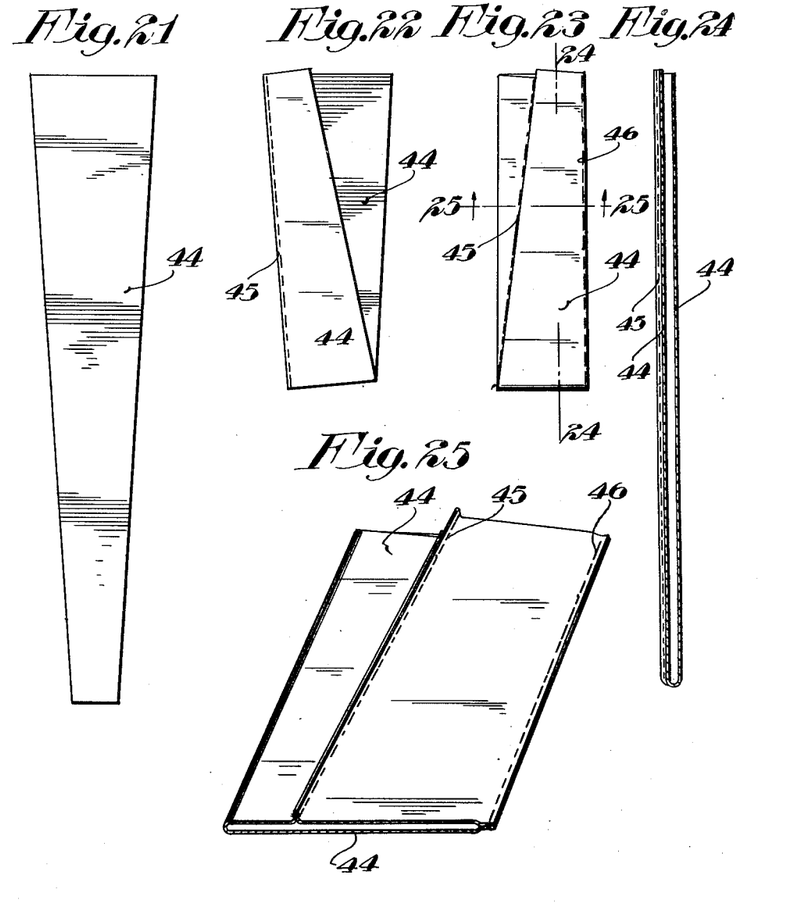
Fig. 21 shows an intestine such as illustrated in Fig. 19 slit and spread out flat.
Fig. 22 shows the smaller half portion of the intestine of Fig. 21 turned back upon itself in position for stitching of one edge thereof.
Fig. 23 shows the folded intestine of Fig. 22 shifted for stitching of the second edge thereof.
Fig. 24 is an enlarged section taken on the line 24—24 of Fig. 23.
Fig. 25 is a perspective of the casings formed as shown in Fig. 23.

Figs. 21 to 25, inclusive, illustrate the manner of forming a casing from a double length tapered intestine which has been first slit and laid out flat and then turned double back upon itself. The long flattened intestine 44 in Fig. 1 is assembled to be laid smooth face upward so that when it is laid back upon itself, as shown in Fig. 22, with one edge lapped for stitches 45, the smooth faces of the two portions of the intestine will be brought together. Next, the lapped portion of the intestine is shifted, as shown in Fig. 23, for stitching of the other side at 46. As shown in Fig. 24, the lapped portions of the intestine will be closed at one end and may be opened when desired. Fig. 25 shows the casing after it has been stitched to form a casing of the total diameter of the two portions of the intestine. To complete the casing it should be turned inside out in respect to Fig. 25 so as to turn the fatty surface of the intestines and the seams to the inside of the casing.

Figure 26:
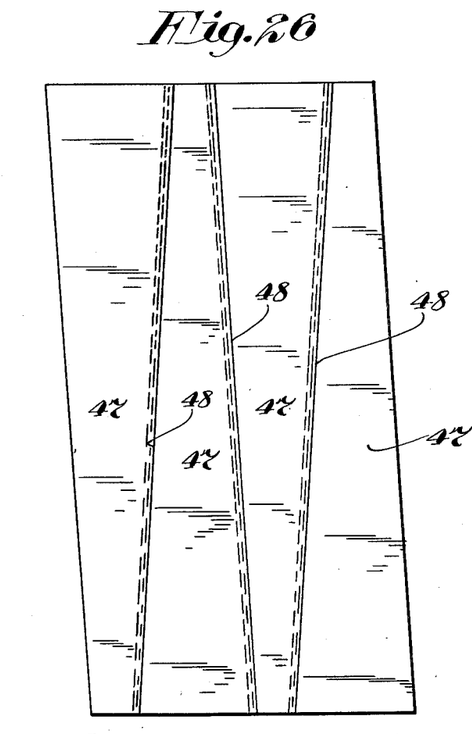
Fig. 26 shows four small tapered intestines in reverse tapered arrangement positioned for stitching of all of the edges thereof except the last.
Figure 27:
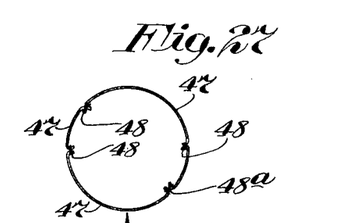
Fig. 27 is an end view showing the casing formed from the sections of the intestines assembled as in Fig. 26, said casing being turned so that the seams are on the inner side thereof.
Figure 28:
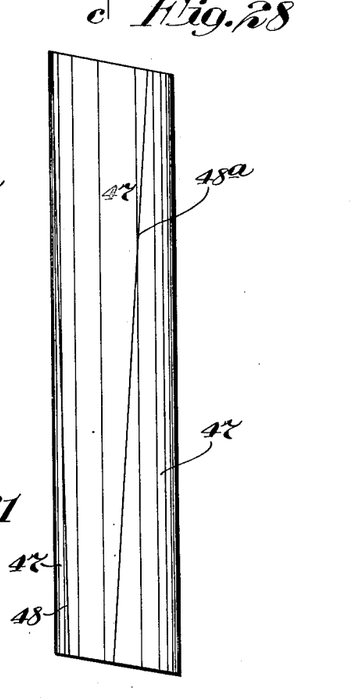
Fig. 28 is a plan view of the casing shown in Fig. 27 looking upward at the same or in the direction of the arrow marked c adjacent Fig. 27.

Figs. 26, 27 and 28 illustrate a casing made up of four relatively small tapered intestines 47 which have been slit, laid out flat and have their edges stitched together at 48. The seams 48 may be formed either by overlapping the edges of the intestines or by placing them folded together with their edges aligned, but, as shown, they are formed by the latter noted arrangement so that said seams 48 as well as the last seam 48ª will be at the outer side of the casing, until the casing has been turned inside out, as shown in Figs. 27 and 28, where all the seams will be turned inward.

In forming the casings such as illustrated in Figs. 15 to 28, inclusive, the slit and flatly laid out intestines are preferably smoothed out and partly dried on some suitable surface such as an absorbent cloth-covered plate or belt.

Figures 29, 30, 31:
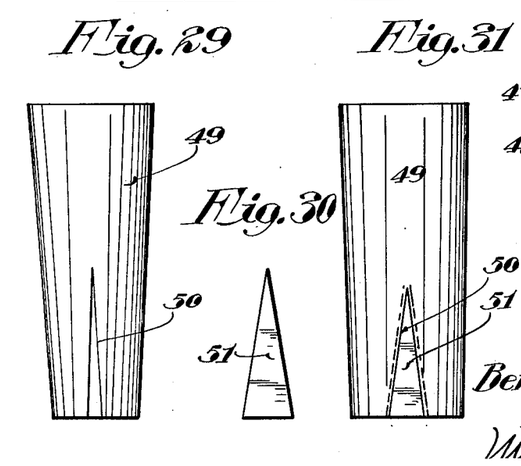
Fig. 29 is a plan view showing an intestine slit from one end approximately to its central portion so as to receive a tapered gore.
Fig. 30 is a plan view showing in detail a tapered gore of intestine applicable and slit of the intestine shown in Fig. 29.
Fig. 31 is a plan view of the intestine shown in Fig. 29 with the gore of Fig. 30 applied thereto to form a casing.

In forming casings in accordance with the illustration of Figs. 29, 30 and 31, an intestine 49 is slit from its small end well up toward its middle portion, as indicated at 50 in Fig. 29, and then a gore or wedged-shaped or tapered piece of intestine 51 is stitched into the slit 50 so as to expand the smaller portion of the intestine and thereby produce an intestine that closely approximates uniformity of diameter from end to end. At any rate the inserted gore or tapered section 51 offsets the natural taper of the intestine to the extent to which it is applied.

There are many reasons why the trade prefer and in many instances demand casings of uniform or substantially uniform diameter. Sausages in uniform casings cook more evenly throughout their length. In the manufacture of dry sausages uniform casings dry uniformly throughout the piece. They will handle and pack for shipment in more compact form without breakage and will require much less time in packing. They give a much better finished product not only because of uniform appearance, but because they will produce uniform slices and may be more readily handled in slicing machines.

Another important fact should be noted, to wit: that the smaller ends of the intestines which are thinner and weaker than the larger ends extend materially less than half way around or 90 degrees of the ends of the completed casing, while the relatively strong and thicker portions extend materially more than half way around the ends of such casings. If casings were to be filled with water, the advantage of increased strength would be negligible, but in filling with the more solid material such as ground meats where the friction against the major portions of the relatively strong portions of the casing is considerable, the total resisting strength of the casing at its ends is increased very greatly over that strength that is found in the thin and relatively weak portions of the casing. The relation above described of the relative thickness and strength varies from end to end of the casing and at the central portion thereof where the two intestines extend approximately 180 degrees, the two casing-forming intestines will be of substantially the same strength and thickness. Of course, in different casings the exact relation above indicated will vary somewhat.

Attention is called to the fact that in Figs. 1 to 4, inclusive, the casing there illustrated shows approximately the taper of an average intestine, but illustrates only a section of a complete casing, that is, a section of approximately six inches of a casing that would actually be about 27 inches to 30 inches long and hence that the variation between the extreme diameters of the ends of an actual casing would be four or five times as much as that illustrated in said views.

What I claim is:

1. An animal casing comprising a plurality of tapered intestinal portions superimposed and secured together at their longitudinal edges in reverse tapered relation whereby to form a casing of substantially uniform expansibility and of uniform diameter.

2. An animal casing made up of a plurality of tapered slit intestinal portions having their longitudinal edges secured together in reverse tapered arrangement so that the secured edges are substantially diametrically opposite at the center of the casing and approach each other toward the ends of the casing, thereby producing a casing of substantially uniform diameter and expansibility, and of a diameter approximately equal to the aggregate diameters of the several intestinal portions.

3. A process of producing relatively large animal casings from a plurality of relatively small tapered intestinal portions which consists in longitudinally slitting and connecting the longitudinal edges of said intestinal portions in reverse tapered arrangement, whereby the taper of the one intestinal portion will offset the taper of the other and a relatively large casing of substantially uniform diameter and expansibility will be produced.

4. The process defined in claim 3 which further consists in applying combined sealing and reinforcing strips over the stitched longitudinal edges of said intestinal portions at the exterior thereof and then turning the casing inside out so that said strips will be at the inner side of the casing.

5. The process of producing relatively large animal casings from a plurality of relatively small tapered intestinal portions which consists in telescoping said intestinal portions in reverse tapered arrangement, and slitting and stitching together the longitudinally slit edges of said intestinal portions so that the taper of the one offsets that of the other, and a casing of relatively large diameter is produced.

6. The process of producing relatively large animal casings from a plurality of relatively small tapered intestinal portions which consists in telescoping two tapered intestinal portions in reverse tapered arrangement with their normally interior smooth surfaces in contact, and longitudinally slitting and stitching together the edges of said intestinal portions while in reverse tapered arrangement, in separating the smooth normal interior surfaces of said intestinal portions to produce a casing of relatively large and of approximately uniform diameter, and then turning the casing thus formed inside out so as to turn the seams, the fatty normally interior surface of the intestine within the casing, and the smooth normally inner surfaces of said intestinal portions to the exterior of the casing.

7. The process defined in claim 6 which consists further in applying combined sealing and reinforcing strips over the stitched edges of the casing before turning of the casing to final form, whereby in the finished casing said strips will be at the interior of the casing.

8. A process of producing relatively large animal casings from tapered intestinal portions, which consists in superimposing and securing said portions at their longitudinal edges in reverse tapered relationship, whereby the taper of the one intestinal portion will offset the taper of the other, and a relatively large casing of substantially uniform diameter and expansibility will be produced.

In testimony whereof I affix my signature.

BERNARD JOSEPH MUMM.